(12) United States Patent
Ueda et al.

(10) Patent No.: US 8,724,012 B2
(45) Date of Patent: *May 13, 2014

(54) CAMERA BODY AND CAMERA SYSTEM USING DRIVING METHOD INFORMATION INDICATING CAPABILITY OF CONTROLLING FOCUS LENS

(71) Applicant: Panasonic Corporation, Osaka (JP)

(72) Inventors: Hiroshi Ueda, Osaka (JP); Koji Shibuno, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/914,677

(22) Filed: Jun. 11, 2013

(65) Prior Publication Data

US 2013/0271644 A1  Oct. 17, 2013

Related U.S. Application Data

(63) Continuation of application No. 12/988,712, filed as application No. PCT/JP2009/001820 on Apr. 21, 2009, now Pat. No. 8,488,050.

(30) Foreign Application Priority Data

Apr. 21, 2008 (JP) ................. 2008-109870

(51) Int. Cl.
    *H04N 5/232* (2006.01)
    *G03B 13/00* (2006.01)

(52) U.S. Cl.
    USPC ............... 348/346; 348/333.02; 348/360

(58) Field of Classification Search
    USPC .......... 348/207.99, 208.11, 333.01, 333.04, 348/345–357, 360, 333.02; 396/79–83, 396/89–152; 250/201.4, 201.6, 201.7; 352/139, 140; 359/696, 698
    See application file for complete search history.

(56) References Cited

U.S. PATENT DOCUMENTS

| 5,731,920 A | 3/1998 | Katsuragawa |
| 2002/0047912 A1 | 4/2002 | Mabuchi et al. ............. 348/345 |

(Continued)

FOREIGN PATENT DOCUMENTS

| EP | 2 270 586 | 1/2011 |
| JP | 2-232633 | 9/1990 |

(Continued)

OTHER PUBLICATIONS

Translation of the International Preliminary Report on Patentability (PCT/IB/338) mailed on Dec. 29, 2010 with PCT/IB/373 & PCT/ISA/237 for corresponding application, PCT/JP2009/001820.

(Continued)

*Primary Examiner* — Lin Ye
*Assistant Examiner* — Dennis Hogue
(74) *Attorney, Agent, or Firm* — Panasonic Patent Center

(57) ABSTRACT

A camera body including a receiving unit that receives an operation by a user, an obtaining unit that obtains driving method information indicating a capability of controlling a focus lens from a mounted interchangeable lens, a body controller that controls the camera body and generates a control signal for controlling the interchangeable lens, and a sending unit that sends the control signal to the interchangeable lens. The body controller determines control of the interchangeable lens by referring to the driving method information to generate a control signal that instructs the interchangeable lens to perform the determined control. The receiving unit receives a selection of one driving method setting menu from a plurality of driving method setting menus, and makes a driving method setting menu, which uses a driving method other than the driving method indicated by the driving method information, unselectable.

12 Claims, 10 Drawing Sheets

(56) References Cited

U.S. PATENT DOCUMENTS

| | | |
|---|---|---|
| 2004/0257461 A1 | 12/2004 | Toyomura |
| 2006/0033831 A1* | 2/2006 | Ejima et al. ............... 348/333.01 |
| 2007/0269197 A1* | 11/2007 | Ide et al. ..................... 396/125 |
| 2007/0279516 A1 | 12/2007 | Ishii ............................ 348/345 |
| 2008/0025714 A1 | 1/2008 | Ishii ............................ 396/104 |
| 2008/0118238 A1* | 5/2008 | Sogawa et al. ............... 396/128 |
| 2009/0051807 A1* | 2/2009 | Kunishige et al. ............ 348/353 |
| 2009/0160956 A1* | 6/2009 | Yumiki et al. ............ 348/208.11 |

FOREIGN PATENT DOCUMENTS

| | | |
|---|---|---|
| JP | 4-280239 | 10/1992 |
| JP | 8-179414 | 7/1996 |
| JP | 2000-258680 | 9/2000 |
| JP | 2004-070038 | 3/2004 |
| JP | 2005-242114 | 9/2005 |
| JP | 2007-310009 | 11/2007 |
| JP | 2007-334143 | 12/2007 |

OTHER PUBLICATIONS

European Search Report, Application No. EP 09734629.0-2209, dated Mar. 4, 2011.

International Search Report of PCT Application No. PCT/JP2009/001820 dated Jun. 2, 2009.

* cited by examiner

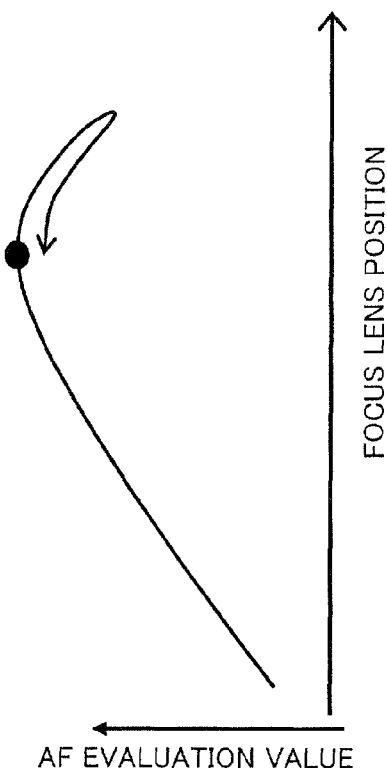
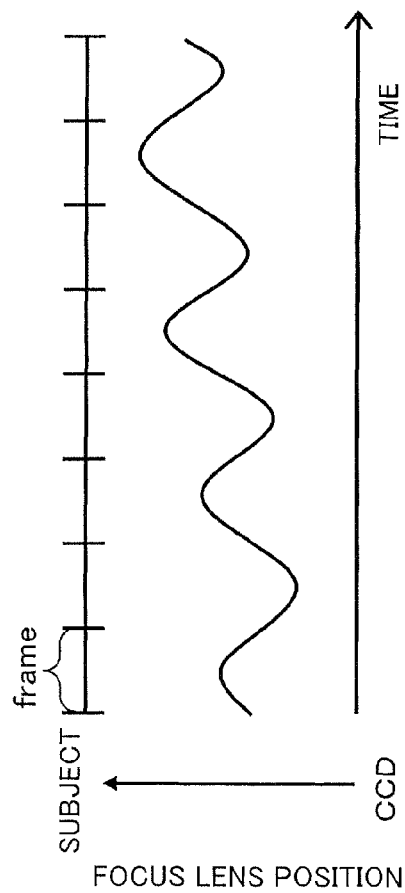
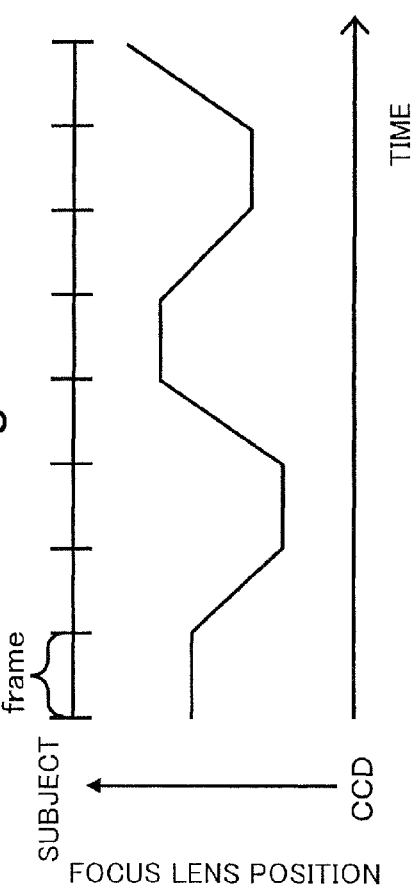

CAMERA BODY AND CAMERA SYSTEM USING DRIVING METHOD INFORMATION INDICATING CAPABILITY OF CONTROLLING FOCUS LENS

TECHNICAL FIELD

The present invention relates to a camera system including an interchangeable lens and a camera body, and more particularly, to a camera system capable of adjusting a focus state.

BACKGROUND ART

Patent Document 1 discloses an interchangeable lens type camera apparatus. A lens unit mountable to the camera apparatus has driving systems for automatic focus adjustment and automatic exposure control. Also, the lens unit mountable to the camera apparatus has status information of the lens unit. In this camera apparatus, a camera body controls the lens unit by communicating various control information and status information between the camera body and the lens unit.

PRIOR ART DOCUMENTS

Patent Documents

Patent Document 1: JP 04-280239 A

SUMMARY OF INVENTION

Problems to be Solved by the Invention

As described above, Patent Document 1 discloses only status information of the driving systems for automatic focus adjustment and automatic exposure control as information held by the lens unit. However, with such a configuration, it is unknown whether, when predetermined autofocus control is performed, the lens unit can accept the autofocus control. Hence, with such a configuration, when autofocus control is performed, the lens unit cannot be precisely controlled from the camera. For example, autofocus control by a driving method that is not supported by the lens unit is instructed to the lens unit from the camera, the lens unit cannot carry out the instruction, thus causing a malfunction.

The present invention is made to solve the above-described problem, and has an object to provide a camera system on which a camera body can precisely control an interchangeable lens when autofocus control is performed.

Means for Solving the Problems

In a first aspect a camera body to which an interchangeable lens is mountable is provided. The camera body includes an imaging unit that can capture a subject image, a receiving unit that receives an operation by a user, an obtaining unit that obtains driving method information of the interchangeable lens from the interchangeable lens, the driving method information indicating a capability of controlling a focus lens, a body controller that controls the camera body and generates a control signal for controlling the interchangeable lens, and a sending unit that sends the generated control signal to the interchangeable lens. The body controller determines control to be performed on the interchangeable lens, by referring to the driving method information obtained from the interchangeable lens, and generates a control signal that instructs the interchangeable lens to perform the determined control. The receiving unit receives a selection of one driving method setting menu from a plurality of driving method setting menus, and makes a driving method setting menu, which uses a driving method other than the driving method indicated by the driving method information obtained by the obtaining unit, unselectable.

In a second aspect, a camera system including an interchangeable lens and a camera body is provided. The interchangeable lens includes a focus lens that changes a focus state of a subject image, a drive unit that drives the focus lens back and forth along an optical axis, a storage unit that stores driving method information indicating a capability of controlling the focus lens, a sending unit that sends the driving method information stored in the storage unit to the camera body, and a lens controller that controls an operation of the interchangeable lens. The camera body includes an imaging unit that can capture a subject image, a receiving unit that receives an operation by a user, an obtaining unit that obtains the driving method information of the interchangeable lens from the interchangeable lens, a body controller that controls the camera body and generates a control signal for controlling the interchangeable lens, and a sending unit that sends the generated control signal to the interchangeable lens. The body controller determines control to be performed on the interchangeable lens, by referring to the driving method information obtained from the interchangeable lens, and generates a control signal that instructs the interchangeable lens to perform the determined control. The receiving unit receives a selection of one driving method setting menu from a plurality of driving method setting menus, and makes a driving method setting menu, which uses a driving method other than the driving method indicated by the driving method information obtained by the obtaining unit, unselectable.

Effect of the Invention

According to the present invention, a camera body obtains driving method information about driving methods that can be supported by an interchangeable lens and determines a driving method to be used for autofocus control in the interchangeable lens, according to the driving method information. By this arrangement, when autofocus control is performed, the camera body can precisely control the interchangeable lens.

BRIEF DESCRIPTION OF DRAWINGS

FIGS. 2A, 2B and 2C are schematic diagrams for describing driving method information.

MODE FOR CARRYING OUT THE INVENTION

A lens interchangeable type camera system which is one embodiment of the present invention will be described below using the accompanying drawings. In the following embodiments, for a lens interchangeable type camera system, a configuration will be described that enables precise lens drive control according to the type of autofocus control that can be supported by an interchangeable lens.

First Embodiment 1-1. Configuration
1-1-1. Overview

Figure 1:
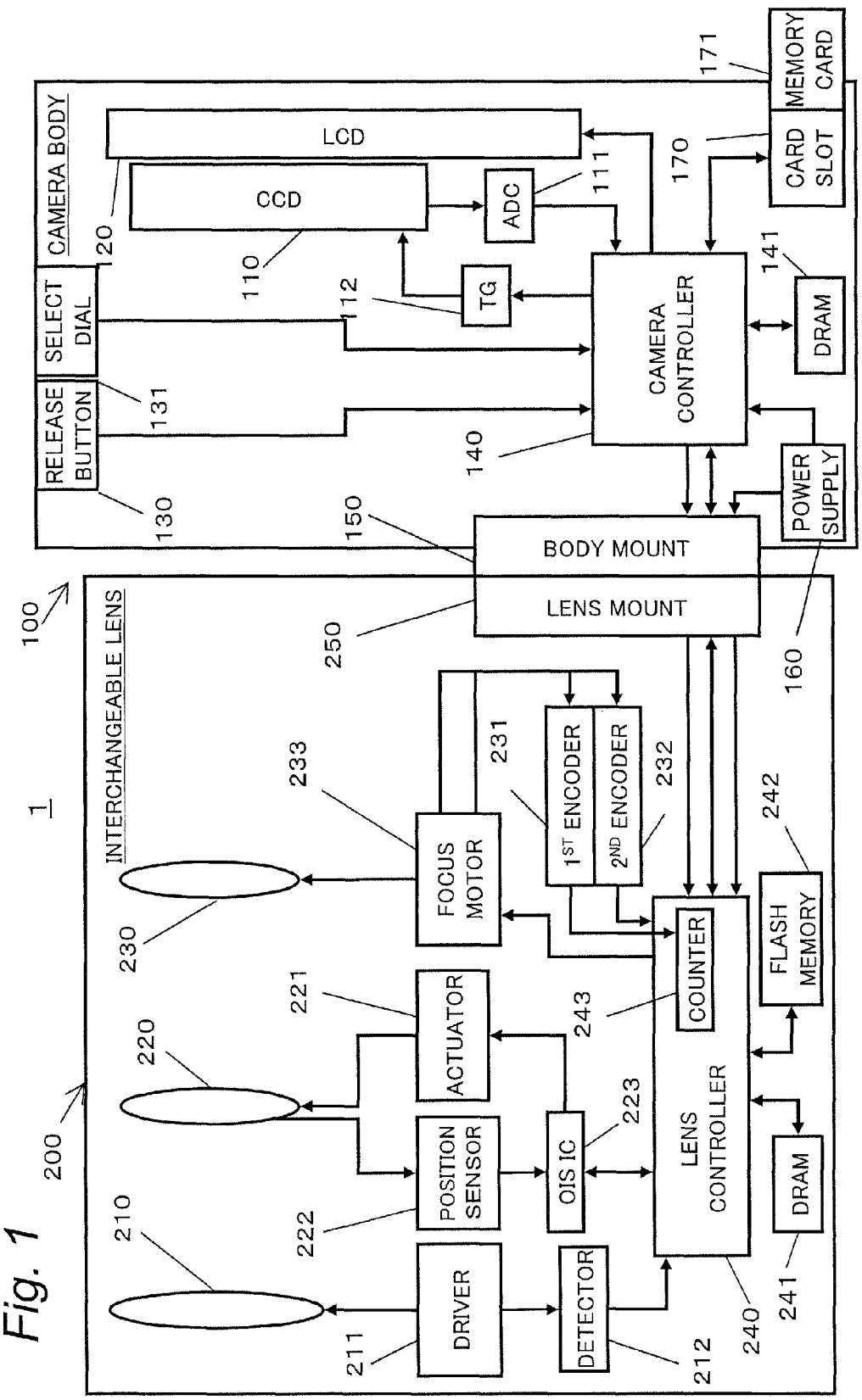
FIG. 1 is a block diagram of a camera system 1.

FIG. 1 is a block diagram showing a configuration of a camera system 1 in a first embodiment. The camera system 1 is configured by a camera body 100 and an interchangeable lens 200 mountable to the camera body 100. The camera system 1 can perform autofocus control by automatically driving a focus lens 230.

1-1-2. Configuration of Camera Body

The camera body 100 includes a CCD image sensor 110, a liquid crystal display monitor 120, a camera controller 140, a body mount 150, a power supply 160, and a card slot 170.

The camera controller 140 entirely controls the camera system 1, for example, the CCD image sensor 110, according to an instruction from an operation member such as a release button 130. The camera controller 140 sends a vertical synchronizing signal to a timing generator 112. In parallel with this, the camera controller 140 generates an exposure synchronizing signal based on the vertical synchronizing signal. The camera controller 140 periodically and repeatedly sends the generated exposure synchronizing signal to a lens controller 240 through the body mount 150 and a lens mount 250. The camera controller 140 uses a DRAM 141 as a work memory for performing a control operation or image processing operation.

The CCD image sensor 110 captures a subject image incident thereon through the interchangeable lens 200 to generate image data. The generated image data is digitized by an AD converter 111. The image data digitized by the AD converter 111 is subjected to various image processing by the camera controller 140. The various image processing as used herein includes, for example, a gamma correction process, a white balance correction process, a flaw correction process, a YC conversion process, an electronic zoom process, and a JPEG compression process.

The CCD image sensor 110 operates at timing controlled by the timing generator 112. The operations of the CCD image sensor 110 include a still image capturing operation, a moving image capturing operation, a through image capturing operation, and the like. Switching between a still image capturing operation and a moving image capturing operation is performed by a user performing an operation on a still image/moving image selection dial 131. Note that the through image is an image that is not recorded in a memory card 171 after being captured. The through image is mainly a moving image and is displayed on the liquid crystal display monitor 120 to cause a user to determine a composition of a still image.

The liquid crystal display monitor 120 displays an image represented by display image data having been subjected to image processing by the camera controller 140. The liquid crystal display monitor 120 can selectively display a moving image or a still image.

The card slot 170 allows the memory card 171 to be inserted thereinto. The card slot 170 controls the memory card 171 based on control by the camera controller 140. The memory card 171 can store image data generated by image processing by the camera controller 140. For example, the memory card 171 can store JPEG image files. The memory card 171 can also output image data or an image file stored therein. The image data or image file outputted from the memory card 171 is subjected to image processing by the camera controller 140. For example, the camera controller 140 decompresses image data or an image file obtained from the memory card 171 and generates display image data.

The power supply 160 supplies power to be consumed by the camera system 1. The power supply 160 may be, for example, a dry battery or rechargeable battery. Alternatively, the power supply 160 may supply the camera system 1 with power provided from an external source through a power cable.

The body mount 150 can be mechanically and electrically connected to the lens mount 250 of the interchangeable lens 200. The body mount 150 can send/receive data to/from the interchangeable lens 200 through the lens mount 250. The body mount 150 sends an exposure synchronizing signal received from the camera controller 140, to the lens controller 240 through the lens mount 250. The body mount 150 also sends other control signals received from the camera controller 140, to the lens controller 240 through the lens mount 250. Further, the body mount 150 sends signals received from the lens controller 240 through the lens mount 250, to the camera controller 140. For example, the body mount 150 sends to the camera controller 140 driving method information about driving methods for the focus lens 230 which is received from the lens controller 240 through the lens mount 250. Also, the body mount 150 supplies power received from the power supply 160, to the entire interchangeable lens 200 through the lens mount 250.

1-1-3. Configuration of Interchangeable Lens

The interchangeable lens 200 includes an optical system, the lens controller 240, and the lens mount 250. The optical system of the interchangeable lens 200 includes a zoom lens 210, an OIS lens 220, and the focus lens 230.

The zoom lens 210 is a lens for changing the magnification of a subject image formed by the optical system of the interchangeable lens 200. The zoom lens 210 is configured by one or a plurality of lenses. A drive mechanism 211 includes a zoom ring operable by the user, and the like, and sends the zoom lens 210 an operation performed by the user to move the zoom lens 210 in an optical axis direction of the optical system. A detector 212 detects a position of the zoom lens 210 in the drive mechanism 211. The lens controller 240 obtains a detection result obtained by the detector 212 and can thereby grasp the zoom magnification of the optical system.

The OIS lens 220 is a lens for correcting a blur of a subject image formed by the optical system of the interchangeable lens 200. The OIS lens 220 reduces a blur of a subject image on the CCD image sensor 110 by moving in a direction to compensate for a shake of the camera system 1. The OIS lens 220 is configured by one or a plurality of lenses. An actuator 221 receives control from an OIS IC 223 and drives the OIS lens 220 in a plane perpendicular to an optical axis of the optical system. The actuator 221 can be implemented by, for example, a magnet and a planar coil. A position detection sensor 222 is a sensor that detects a position of the OIS lens 220 in the plane perpendicular to the optical axis of the optical system. The position detection sensor 222 can be implemented by, for example, a magnet and a Hall element. The OIS IC 223 controls the actuator 221 based on a detection result from the position detection sensor 222 and a detection result from a camera shake sensor such as a gyro sensor. The OIS IC 223 obtains the detection result obtained by the camera shake sensor, from the lens controller 240. The OIS IC 223 also sends a signal indicating a state of an optical image blur correction process to the lens controller 240.

The focus lens 230 is a lens for changing the focus state of a subject image formed on the CCD image sensor 110 through the optical system. The focus lens 230 is configured by one or a plurality of lenses.

A focus motor 233 drives the focus lens 230 to move back and forth along the optical axis of the optical system, based on control by the lens controller 240. By this, the focus state of a subject image formed on the CCD image sensor 110 through the optical system can be changed. In the first embodiment, a DC motor can be used as the focus motor 233. However, in the present embodiment the focus motor 233 is not limited thereto and can also be implemented by a stepping motor, a servo motor, an ultrasonic motor, and the like.

A first encoder 231 and a second encoder 232 are encoders that generate a signal indicating a driving state of the focus lens 230. The first encoder 231 and the second encoder 232 can be implemented by, for example, a rotor mounted on a rotating shaft of the focus motor 233 and a photocoupler. Here, the rotor is a disk having holes formed at predetermined intervals. The photocoupler emits detection light from one side of the rotor and receives light from the other side. Therefore, by the rotor rotating, the photocoupler is alternately switched between ON and OFF states. The lens controller 240 has a counter 243 provided therein. The counter 243 counts the number of switches between ON and OFF states from the photocoupler. The first encoder 231 and the second encoder 232 are different in phase from each other. Therefore, a movement direction of the focus lens 230 for when the state of the first encoder 231 is switched from OFF to ON can be determined. Specifically, the states of the second encoder 232 for when the state of the first encoder 231 is switched from OFF to ON include an ON state and an OFF state. Hence, when the state of the first encoder 231 is switched from OFF to ON with the state of the second encoder 232 being ON, it is determined to be a forward rotation, and thus the counter 243 counts it as "+1". When the state of the first encoder 231 is switched from OFF to ON with the state of the second encoder 232 being off, it is determined to be a reverse rotation, and thus the counter 243 counts it as "−1". By adding the counted values together, the lens controller 240 can grasp the amount of movement of the focus lens 230.

The lens controller 240 entirely controls the interchangeable lens 200 such as the OIS IC 223 and the focus motor 233, based on control signals from the camera controller 140. For example, the lens controller 240 controls the focus motor 233 to cause the focus lens 230 to move back and forth along the optical axis by a predetermined driving method, based on a control signal from the camera controller 140. Also, the lens controller 240 receives signals from the detector 212, the OIS IC 223, the first encoder 231, the second encoder 232, and the like, and sends the signals to the camera controller 140. The lens controller 240 performs communication with the camera controller 140 through the lens mount 250 and the body mount 150.

The lens controller 240 uses a DRAM 241 as a work memory upon control. A flash memory 242 stores a program and parameters used for control by the lens controller 240. The parameters stored in the flash memory 242 include driving method information pertaining to autofocus control that can be performed by the camera system 1. For example, an interchangeable lens that can perform autofocus control can perform autofocus control by moving a focus lens back and forth along an optical axis by a plurality of driving methods. Thus, in this case, the flash memory 242 stores driving method information about a plurality of driving methods. The driving method information stored in the flash memory 242 will be described in detail below.

1-1-4. Driving Method Information

FIGS. 2A and 2B are schematic diagrams for describing driving methods for the focus lens 230 controllable by the lens controller 240 in the first embodiment.

The camera system 1 in the first embodiment can perform autofocus control by three types of driving methods. The first autofocus control is control that performs an autofocus adjustment by moving the focus lens 230 back and forth along the optical axis at timing such as shown in FIG. 2A. This autofocus control is mainly used when a moving image is captured. This autofocus control is hereinafter referred to as "movie wobbling control". The second autofocus control is control that performs an autofocus adjustment by moving the focus lens 230 back and forth along the optical axis and stop at timing such as shown in FIG. 2B. This autofocus control is mainly used when, in capturing a still image, the focus is continuously adjusted without interruption. This autofocus control is hereinafter referred to as "continuous AF control". The third autofocus control is control that performs an autofocus adjustment by moving the focus lens 230 back and forth along the optical axis at timing such as shown in FIG. 2C. This is the so-called hill climbing autofocus control. This autofocus control is mainly used when a still image is captured. This autofocus control is hereinafter referred to as "single AF control". These three types of autofocus control will be described below.

When movie wobbling control as shown in FIG. 2A is performed, the camera system 1 moves the focus lens 230 minutely back and forth along the optical axis every time a one-frame image is captured. By performing the movie wobbling control in this manner, the focus lens 230 continuously moves. By this arrangement, a smooth moving image can be captured throughout the entire shooting time. The camera system 1 calculates an evaluation value of autofocus operation (hereinafter, referred to as the "AF evaluation value") of image data generated every time a one-frame image is captured to generate image data. Specifically, a method is known, which obtains a luminance signal from image data generated by the CCD image sensor 110, and adds up high-frequency components within the luminance signals of the whole image, to result in an AF evaluation value. As such, in every generation of two frames of image data, the camera system 1 calculates the AF evaluation value in each of a state in which the focus lens 230 is moved to the subject side in the optical axis direction and a state in which the focus lens 230 is caused to move to the side of the CCD image sensor 110. By comparing the two AF evaluation values, the camera system 1 determines whether to move the focus lens 230 to the subject side or to the side of the CCD image sensor 110 in a later cycle. By the camera system 1 thus moving the focus lens 230 minutely back and forth along the optical axis, the camera system 1 can continuously focus without interruption on a subject image when capturing a moving image.

When continuous AF control as shown in FIG. 2B is performed, the camera system 1 repeats a driving and stopping of the focus lens 230 every time a one-frame image is captured. The camera system 1 calculates an AF evaluation value of image data captured when the focus lens 230 is stopped. As such, the camera system 1 generates image data for five frames and calculates AF evaluation values of image data for three frames among the five frames which are generated when the focus lens 230 is stopped. By comparing the AF evaluation values at three points, the camera system 1 can detect at any time a focus point which is more likely to be reliable. By the camera system 1 repeating the driving and stopping of the focus lens 230 near the detected likely-to-be-reliable focus point, the camera system 1 can continuously detect at any time a focus point which is more likely to be reliable.

When single AF control as shown in FIG. 2C is performed, the camera system 1 continuously drives the focus lens 230 in one direction from any position of the interchangeable lens 200. The camera system 1 periodically and continuously calculates an AF evaluation value in accordance with the drive of the focus lens 230. The camera system 1 continuously drives the focus lens 230 in one direction so long as the AF evaluation value keeps rising. When the AF evaluation value stops rising and begins to fall, the camera system 1 determines that a focus point has been passed, and thus drives the focus lens 230 in a reverse direction. By this arrangement, the camera system 1 moves the focus lens 230 to the focus point. The camera system 1 can detect a focus point by driving the focus lens 230 in this manner.

By the way, to perform autofocus control by a plurality of types of driving methods in this manner, a driving program for driving the focus lens 230 by predetermined driving methods needs to be stored in the flash memory 242 in advance. Meanwhile, various interchangeable lenses can be attached to the camera body 100. For example, an interchangeable lens that does not support movie wobbling control as a focus lens driving method can also be mounted. In such a case, if the camera body 100 instructs the interchangeable lens 200 to perform movie wobbling control, there is a risk that the camera system may malfunction.

In view of this, in the present embodiment, information about control methods that can be supported by the interchangeable lens 200 is stored in the interchangeable lens 200 so that the camera body 100 can refer to the information. Specifically, the flash memory 242 of the interchangeable lens 200 stores information (driving method information) about driving methods for the focus lens 230 used when autofocus control is performed. For example, the flash memory 242 stores driving method information indicating that the interchangeable lens 200 supports three driving methods, that is, movie wobbling control, continuous AF control, and single AF control.

By thus storing driving method information in the flash memory 242, the camera body 100 can obtain beforehand information about driving methods supported by the interchangeable lens 200 from the interchangeable lens 200 and thus can control the interchangeable lens 200 based on the obtained information about driving methods.

Note that in the present embodiment, the driving method information is composed of three bits. A first bit of the three bits indicates whether movie wobbling control is supported, a second bit indicates whether continuous AF control is supported, and a third bit indicates whether single AF control is supported. Specifically, when a bit is "1" it indicates that the interchangeable lens 200 supports the corresponding autofocus control, and when "0" it indicates that the interchangeable lens 200 does not support the corresponding autofocus control. Thus, when only movie wobbling control is supported, the driving method information is "100". When only continuous AF control is supported, the driving method information is "010". When continuous AF control and single AF control are supported, the driving method information is "011". Note that the configuration does not necessarily need to be like this. The important point is that the driving method information is information indicating which autofocus control the interchangeable lens 200 can support.

Note that the focus motor 233 is an example of a drive unit. The lens controller 240 is an example of a lens controller. The flash memory 242 is an example of a storage unit. The CCD image sensor 110 is an example of an imaging unit. The still image/moving image selection dial 131 is an example of a receiving unit. A configuration including the camera controller 140 and the body mount 150 is an example of an obtaining unit. The camera controller 140 is an example of a body controller. A configuration including the camera controller 140 and the body mount 150 is an example of a sending unit. The liquid crystal display monitor 120 is an example of a display unit.

1-2. Operations 1-2-1. Image Capturing Preparation Operation

Figure 3:
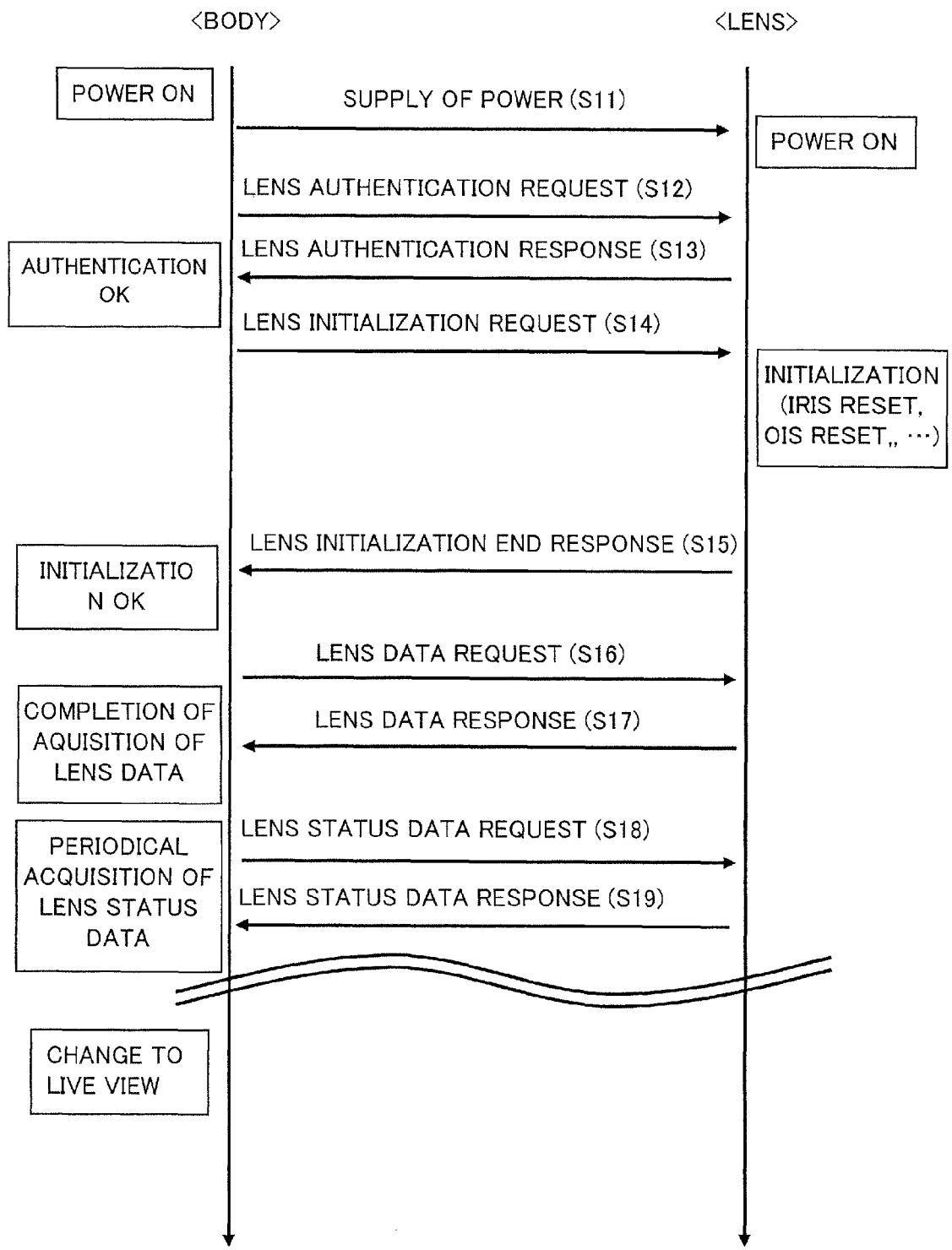
FIG. 3 is a chart for communication performed between a body and a lens during an imaging preparation operation.

First, the operation of the camera system 1 for imaging preparation will be described. FIG. 3 is a diagram showing communication of signals to describe an image capturing preparation operation of the camera system 1 according to the first embodiment.

When the user turns on the camera body 100 mounted with the interchangeable lens 200, the power supply 160 supplies power to the interchangeable lens 200 through the body mount 150 and the lens mount 250 (S11). Then, the camera controller 140 requests the lens controller 240 for authentication information of the interchangeable lens 200 (S12). Here, the authentication information of the interchangeable lens 200 includes information on whether the interchangeable lens 200 is mounted and information on whether accessories are mounted. The lens controller 240 responds to the lens authentication request from the camera controller 140 (S13).

Subsequently, the camera controller 140 requests the lens controller 240 to perform an initialization operation (S14). In response to this, the lens controller 240 performs an initialization operation, such as resetting of a diaphragm and resetting of the OIS lens 220. The lens controller 240 then sends a response indicating that the lens initialization operation is completed, to the camera controller 140 (S15).

Then, the camera controller 140 requests the lens controller 240 for lens data (S16). The lens data is stored in the flash memory 242. The lens controller 240 reads the lens data from the flash memory 242 and sends, as a response, the lens data to the camera controller 140 (S17). Here, the lens data includes characteristic values unique to the interchangeable lens 200, such as a lens name, F-number, and a focal length.

Particularly, in the present embodiment, the lens data includes driving method information about driving methods for the focus lens 230 that can be supported by the interchangeable lens 200. By this arrangement, the camera body 100 can obtain driving method information about driving methods for the focus lens 230 that can be supported by the interchangeable lens 200, and the like, in an imaging preparation stage. Specifically, the camera body 100 can obtain at this stage information indicating that the interchangeable lens can move the focus lens 230 back and forth along the optical axis by three driving methods, that is, movie wobbling control, continuous AF control, and single AF control.

When the camera controller 140 recognizes the lens data of the interchangeable lens 200 mounted to the camera body 100, the camera system 1 goes into a state in which an image can be captured. In this state, the camera controller 140 periodically requests the lens controller 240 for lens state data indicating a state of the interchangeable lens 200 (S18). The lens state data includes, for example, zoom magnification information by the zoom lens 210, position information of the focus lens 230, and aperture value information. In response to this request, the lens controller 240 sends, as a response, the requested lens state data to the camera controller 140 (S19).

1-2-2. Autofocus Control

Figure 4:
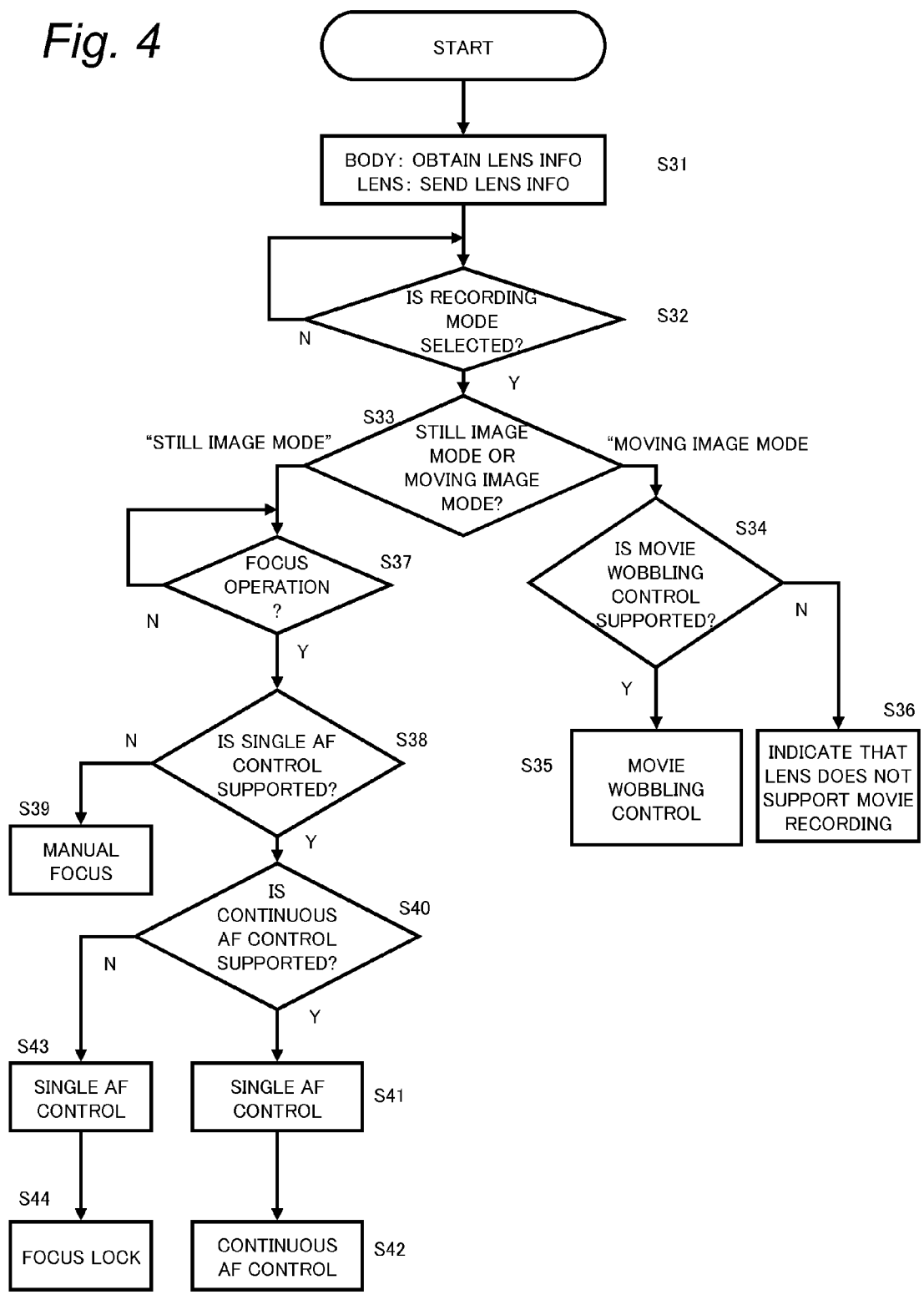
FIG. 4 is a flowchart for autofocus control.
Figure 5:
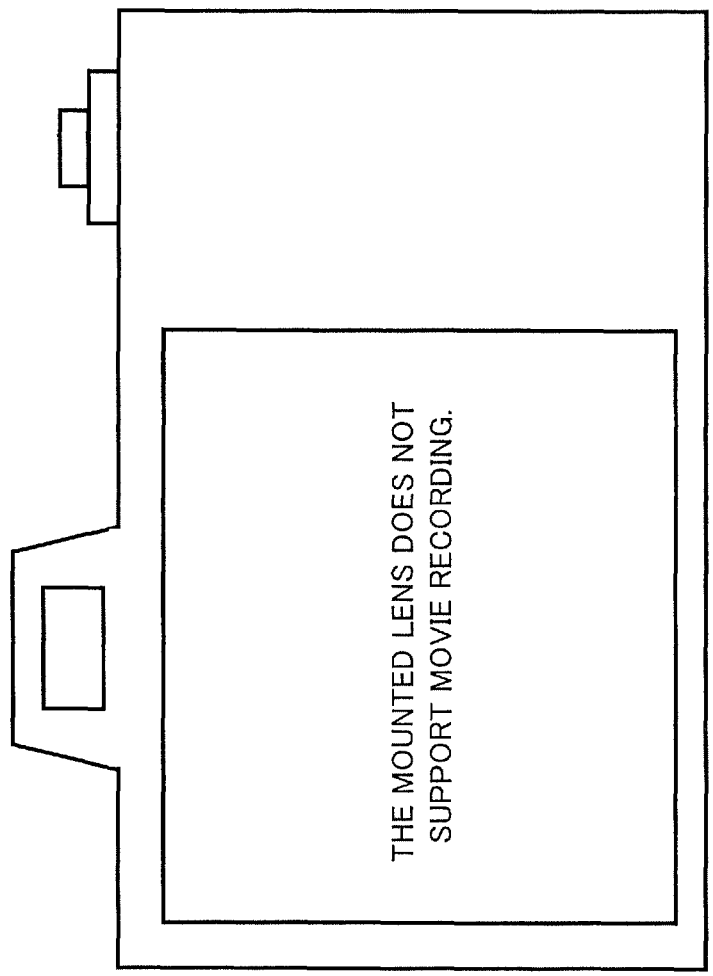
FIG. 5 is a diagram of the back of a camera body 100.

Autofocus control of the camera system 1 on which image capturing preparation has been completed in the above-described manner will be described using FIGS. 4 and 5. FIG. 4 is a flowchart for autofocus control of the camera system 1. FIG. 5 is a diagram of the back of the camera body 100 in a state in which an alert is displayed.

When the camera body 100 is turned on, in an image capturing preparation stage, the camera body 100 obtains driving method information for the focus lens 230 from the interchangeable lens 200 (S31). Then, at this stage, the camera body 100 is on standby until a recording mode is selected by the user (S32). In the present example, it is assumed that as the recording mode a mode for capturing a still image or a mode of capturing a moving image is selected.

When a recording mode is selected, the camera controller 140 determines whether the selected recording mode is a still image recording mode or a moving image recording mode (S33).

If it is determined that the moving image recording mode is selected, then the camera controller 140 determines whether the interchangeable lens 200 can support movie wobbling control (S34). This determination is made based on the driving method information obtained from the interchangeable lens 200 in the image capturing preparation stage. If the driving method information has information indicating that the interchangeable lens 200 supports movie wobbling control, then it can be determined that the interchangeable lens supports movie wobbling control. In the present embodiment, the interchangeable lens 200 supports movie wobbling control.

If it is determined that movie wobbling control is supported, then the camera controller 140 sends a control signal to the lens controller 240 to move the focus lens 230 back and forth along the optical axis by movie wobbling control (S35). By this arrangement, only when an interchangeable lens that can support a recording mode instructed by the user is mounted, a focus lens can be controlled by a driving method corresponding to the recording mode instructed by the user.

If, when a different interchangeable lens than the interchangeable lens 200 is mounted, it is determined that movie wobbling control is not supported, then the camera controller 140 controls the liquid crystal display monitor 120 to provide display as shown in FIG. 5 (S36). As such, when the mounted interchangeable lens does not support movie wobbling control, the camera body 100 notifies the user of the fact through display on the liquid crystal display monitor 120. By this arrangement, the user can be notified that the attached interchangeable lens does not support a moving image recording mode. Also, the camera body 100 does not instruct the interchangeable lens to cause the focus lens 230 to move back and forth along the optical axis by a driving method that is not supported by the interchangeable lens. By this, the risk that a malfunction may occur in the interchangeable lens that does not support a moving image recording mode can be suppressed.

Note that in the present embodiment, the camera body 100 is configured such that, when an interchangeable lens that does not support movie wobbling control is mounted, the camera body 100 provides alert display through the liquid crystal display monitor 120 and does not instruct to move a focus lens back and force along the optical axis in an unsupported drive cycle. However, the configuration is not necessarily limited thereto. For example, when an interchangeable lens that does not support movie wobbling control is mounted, a moving image may be captured by manually performing focus control. By this arrangement, even when an interchangeable lens that does not support movie wobbling control is mounted, a moving image can be captured.

Note also that although in the present embodiment, when an interchangeable lens that does not support movie wobbling control is mounted, the camera body 100 provides on the liquid crystal display monitor 120 alert display indicating that the interchangeable lens does not support moving image shooting, the type of alert display is not necessarily limited thereto. For example, even when an interchangeable lens that does not support movie wobbling control is mounted, if the camera body 100 can perform moving image shooting by manual focus, then the camera body 100 may provide display indicating that moving image shooting can be performed using manual focus.

On the other hand, if it is determined in step S33 that the still image recording mode is selected, then the camera controller 140 determines whether an autofocus operation has been performed by the user (S37). The autofocus operation is a half-press operation of the release button 130.

If it is determined that autofocus operation has been performed, then the camera controller 140 determines whether the interchangeable lens 200 supports single AF control, based on the driving method information (S38). If it is determined that single AF control is not supported, then the camera controller 140 does not perform autofocus control and the focus state of a subject image is adjusted by the user by the so-called manual focus (S39).

If it is determined that signal AF control is supported, then the camera controller 140 determines whether the interchangeable lens 200 supports continuous AF control, based on the driving method information (S40).

If it is determined that continuous AF control is supported, then the camera controller 140 sends a control signal to the lens controller 240 to perform single AF control on the focus lens 230 (S41). After a focus point of a subject image is detected by the single AF control, the camera controller 140 sends, to the lens controller 240, a signal to cause the lens controller 240 to perform continuous AF control on the focus lens 230 (S42). By this arrangement, the camera system 1 continuously moves the focus lens 230 to the focus point until the release button 130 is full-pressed by the user or until the focus operation is completed.

If it is determined that continuous AF control is not supported, then the camera controller 140 sends a control single to the interchangeable lens 240 to perform single AF control on the focus lens 230 (S43). After a focus point of a subject image is detected by the single AF control, the camera controller 140 performs control to lock the focus lens 230 at the detected focus point (S44). By this arrangement, in the camera system 1, the focus lens 230 is continuously locked in the locked position until the release button 130 is full-pressed by the user or until the autofocus operation is completed.

As such, in the present embodiment, the camera body 100 sends different instructions about the drive of the focus lens 230 to the interchangeable lens 200, according to an instruction to capture a still image which is received from the user and the content of driving method information obtained from the interchangeable lens 200. By this arrangement, the most convenient autofocus control among autofocus controls that can be supported by the interchangeable lens 200 can be set.

Also, as such, in the present embodiment, the camera body 100 controls whether to provide an instruction about the drive of the focus lens 230 to the interchangeable lens 200, according to an instruction to capture a moving image which is received from the user and the content of driving method information obtained from the interchangeable lens 200. By this arrangement, an instruction to perform movie wobbling control on a focus lens can be prevented from being provided to an interchangeable lens that does not support moving image shooting.

Second Embodiment

A second embodiment will be described below using FIG. 6. Note that description of the same configurations as those in the first embodiment is omitted (the same also applies to the following embodiments). A camera system according to the present embodiment differs from the camera system according to the first embodiment in part of autofocus control.

2-1. Operations 2-1-1. Autofocus Control

Figure 6:
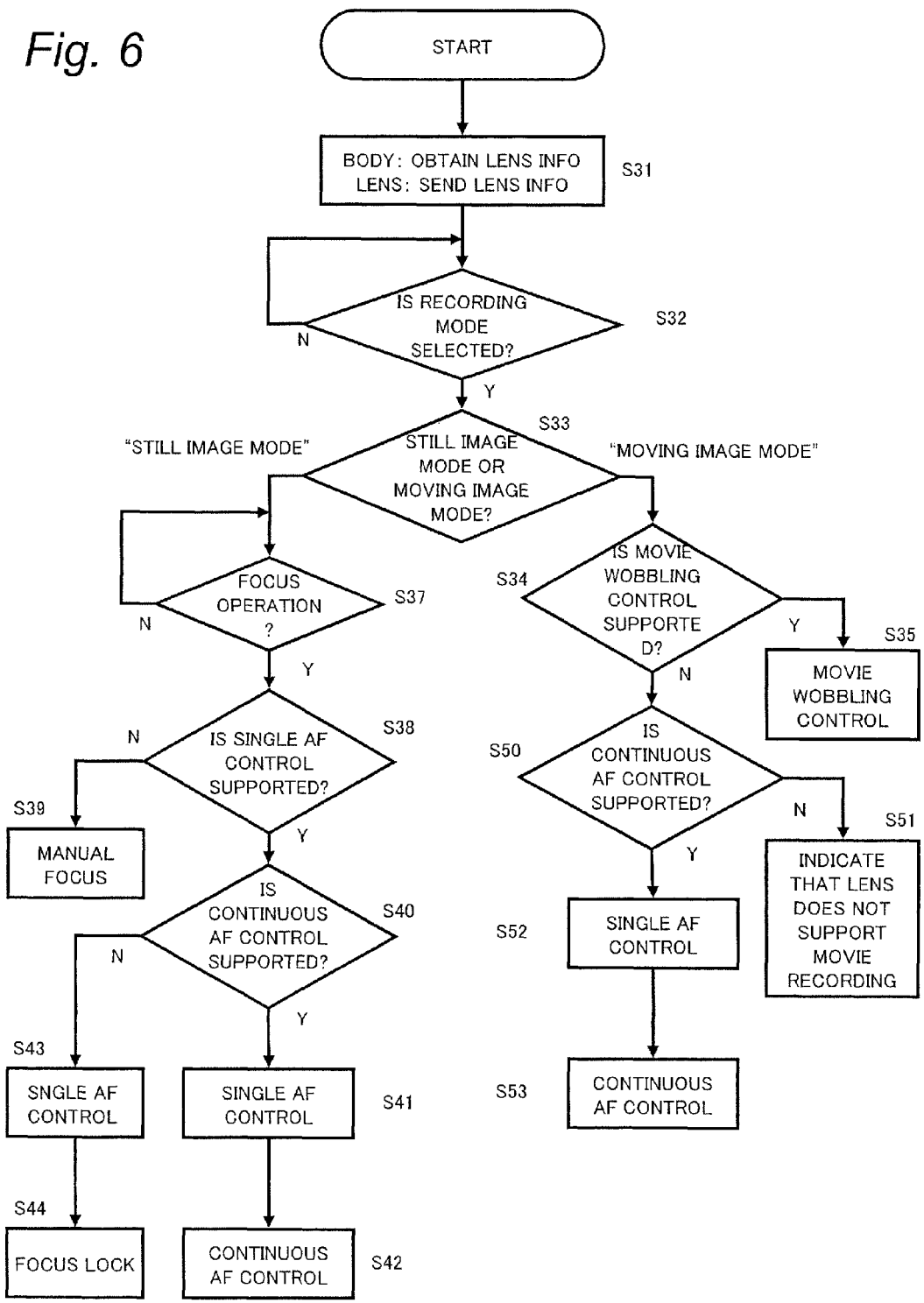
FIG. 6 is a flowchart for autofocus control.

FIG. 6 is a flowchart for autofocus control of the camera system according to the present embodiment. The same steps as those in the autofocus control of the camera system in the first embodiment which is shown in FIG. 4 are denoted by the same reference signs and description thereof is omitted.

The camera system of the present embodiment differs from the camera system of the first embodiment in steps (S50 to S53) performed after a moving image recording mode is selected and a camera controller 140 determines that an interchangeable lens does not support movie wobbling control. The steps will be described below.

If the camera controller 140 determines that the interchangeable lens 200 does not support movie wobbling control (S34), then the camera controller 140 determines whether the interchangeable lens 200 supports continuous AF control, based on driving method information (S50).

If it is determined that continuous AF control is not supported, then the camera controller 140 controls a liquid crystal display monitor 120 to provide alert display as shown in FIG. 5 (S51).

If it is determined that continuous AF control is supported, then the camera controller 140 sends a control signal to a lens controller 240 to perform single AF control on a focus lens 230 (S52). After a focus point of a subject image is detected by the signal AF control, the camera controller 140 sends a control signal to the lens controller 240 to perform continuous AF control on the focus lens 230 (S53). By this arrangement, even when an interchangeable lens that does not support movie wobbling control is mounted, the camera system according to the present embodiment can capture a moving image by continuous AF control. According to this configuration, though the smoothness of a captured moving image is poorer than that of an image captured in movie wobbling control, relatively accurate focus control can be performed, compared to the case in which focus control is not performed at all.

Third Embodiment

In the present embodiment, a method of switching autofocus control methods during a zoom operation will be described. During a zoom operation performed by the user, unless an autofocus operation by movie wobbling control is performed, changes in subject cannot be followed and thus an autofocus function does not operate properly. Hence, when an interchangeable lens 200 does not support movie wobbling control, an autofocus operation is controlled to stop during a zoom operation. This control will be described in detail below with reference to a flowchart in FIG. 7.

Figure 7:
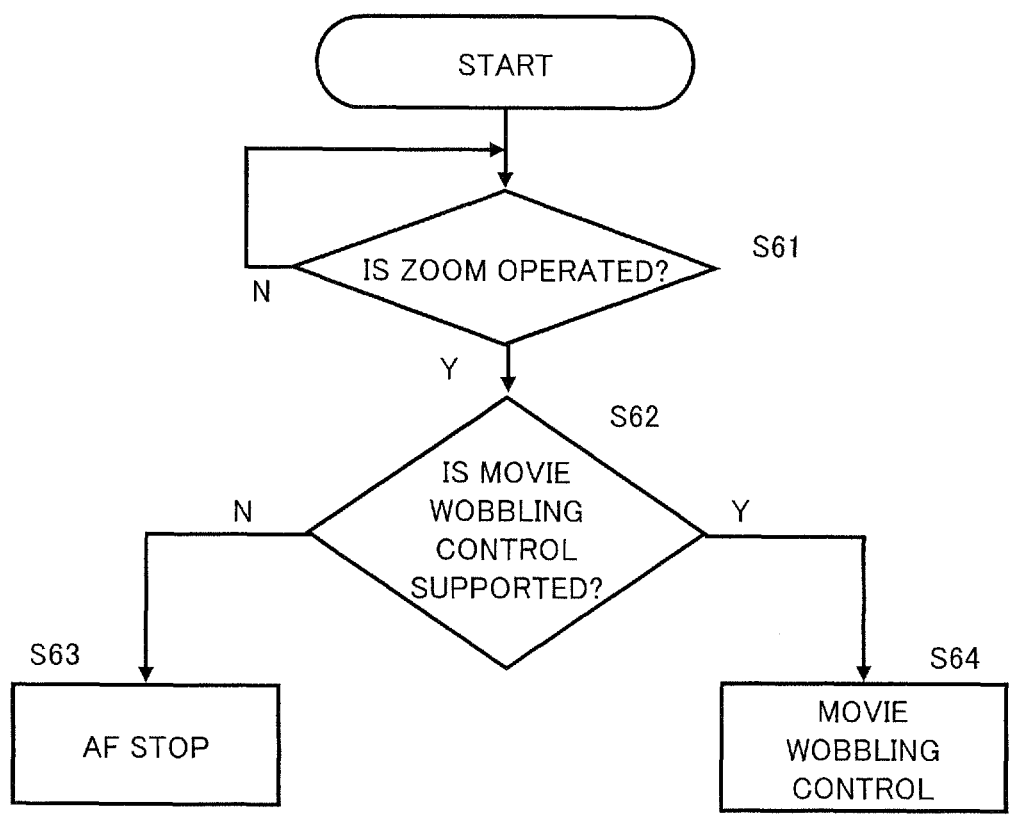
FIG. 7 is a flowchart for autofocus control during a zoom operation.

In FIG. 7, a camera controller 140 determines whether a zoom operation is being performed by the user (S61). If a zoom operation is being performed, then the camera controller 140 determines whether the interchangeable lens 200 supports movie wobbling control, by referring to driving method information obtained from the interchangeable lens 200 (S62).

If it is determined that the interchangeable lens 200 supports movie wobbling control, then the camera controller 140 sends a control signal to a lens controller 240 to move a focus lens 230 back and forth along an optical axis by movie wobbling control (S64).

On the other hand, if it is determined that the interchangeable lens 200 does not support movie wobbling control, then the camera controller 140 sends a control signal to the lens controller 240 to stop an autofocus operation (S63).

By the above-described control, autofocus control can be prevented from being erroneously performed on the interchangeable lens 200 that does not support movie wobbling control, during a zoom operation.

Fourth Embodiment

Figure 8:
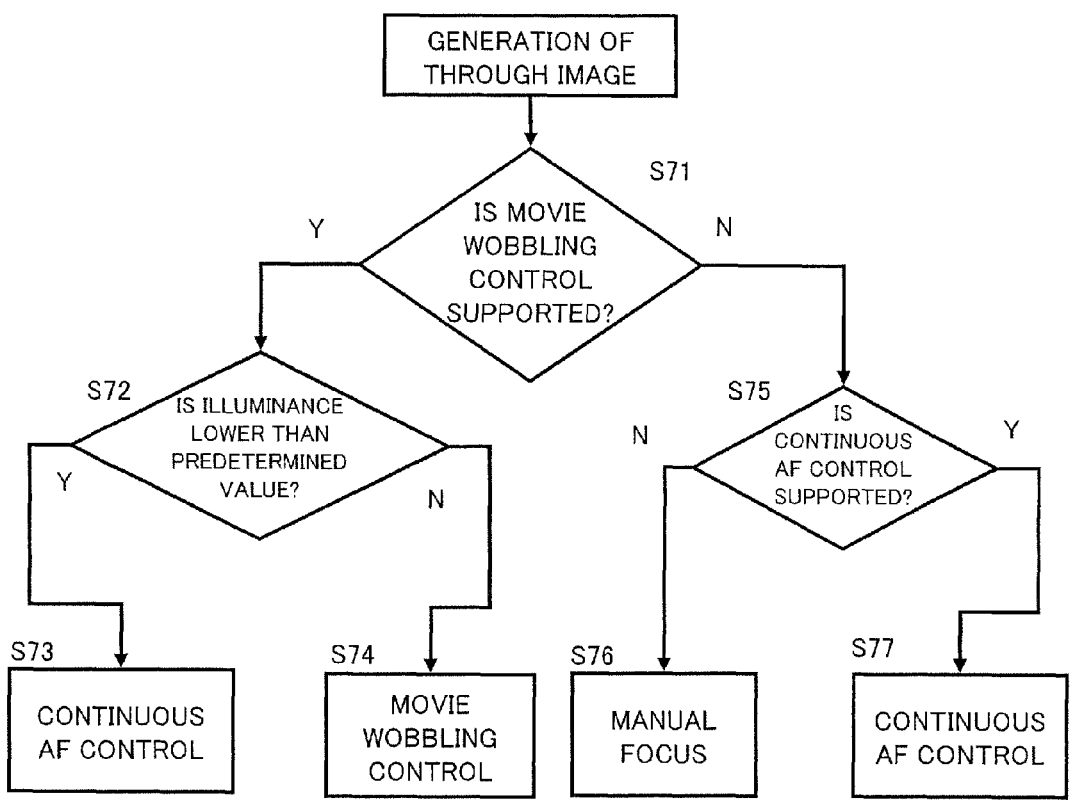
FIG. 8 is a flowchart for autofocus control during a zoom operation.

In the present embodiment, autofocus control for a case where moving image shooting is performed will be described with reference to FIG. 8.

The camera controller 140 determines whether the interchangeable lens 200 can support movie wobbling control, by referring to driving method information obtained from the interchangeable lens 200 (S71).

If it is determined that the interchangeable lens 200 supports movie wobbling control, then the camera controller 140 determines whether the illuminance of a captured image is lower than a predetermined value (S72). If the illuminance of an image is lower than the predetermined value, then the camera controller 140 sends a control signal to a lens controller 240 to perform continuous AF control on a focus lens 230 (S73). The reasons why such control is performed will be described below.

The reasons why continuous AF control is performed instead of movie wobbling control when the illuminance of a captured image is lower than the predetermined value will be described below. When the illuminance of an image is low, noise increases. When movie wobbling control is performed and AF evaluation values are calculated in a state in which there is a lot of noise, since the focus lens minutely moves back and forth at all times, the AF evaluation values are more susceptible to noise. In addition, when AF evaluation values are calculated based on images with a lot of noise, accurate evaluation values cannot be obtained. In view of these points, it is preferred that continuous AF control be used when the illuminance of an image is low. In the case of continuous AF control, since AF evaluation values are calculated with the focus lens being stationary, the AF evaluation values are less susceptible to noise. Note that it is assumed that when the interchangeable lens 200 supports movie wobbling control the interchangeable lens 200 also supports continuous AF control.

If the illuminance of an image is higher than or equal to the predetermined value, then the camera controller 140 sends a control signal to the lens controller 240 to perform movie wobbling control on the focus lens 230 (S74).

By switching between autofocus controls based on the illuminance of an image in the above-described manner, accurate autofocus control according to a shooting condition can be achieved.

On the other hand, if it is determined that the interchangeable lens 200 does not support movie wobbling control, then the camera controller 140 determines whether the interchangeable lens 200 supports continuous AF control, by referring to the driving method information obtained from the interchangeable lens 200 (S75). If the interchangeable lens 200 supports continuous AF control, then the camera controller 140 sends a control signal to the lens controller 240 to perform continuous AF control on the focus lens 230 (S77). If the interchangeable lens 200 does not support continuous AF control, then the camera controller 140 does not perform autofocus control and the focus state of a subject image is adjusted by the user by the so-called manual focus (S76).

As such, even when the interchangeable lens 200 does not support movie wobbling control, if the interchangeable lens 200 supports continuous AF control, then an autofocus operation can be performed by performing continuous AF control.

Other Embodiments

The above-described examples are described as various embodiments. However, the embodiments are not limited thereto. Hence, other embodiments all together will be described below.

Although in the above-described embodiments a driving program is stored in the flash memory 242, the configuration is not necessarily limited thereto. Specifically, a storage medium dedicated to storing a driving program may be provided in the interchangeable lens 200 and a driving program may be stored in the storage medium.

Although in the above-described embodiments the focus lens 230 always performs a wobbling operation when a moving image is captured, the configuration is not necessarily limited thereto. Specifically, autofocus control and manual focus control may be prepared as focus lens control methods performed when a moving image is captured and the control as described in the embodiments may be performed only when an autofocus control mode is selected.

Figure 9:
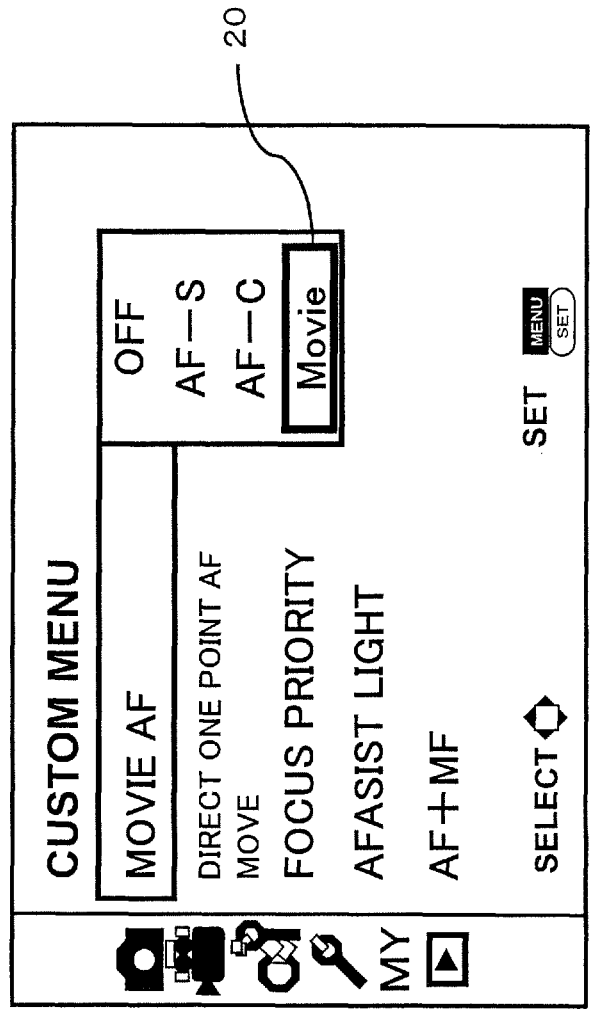
FIG. 9 is a diagram showing an example of driving method setting menus.
Figure 10:
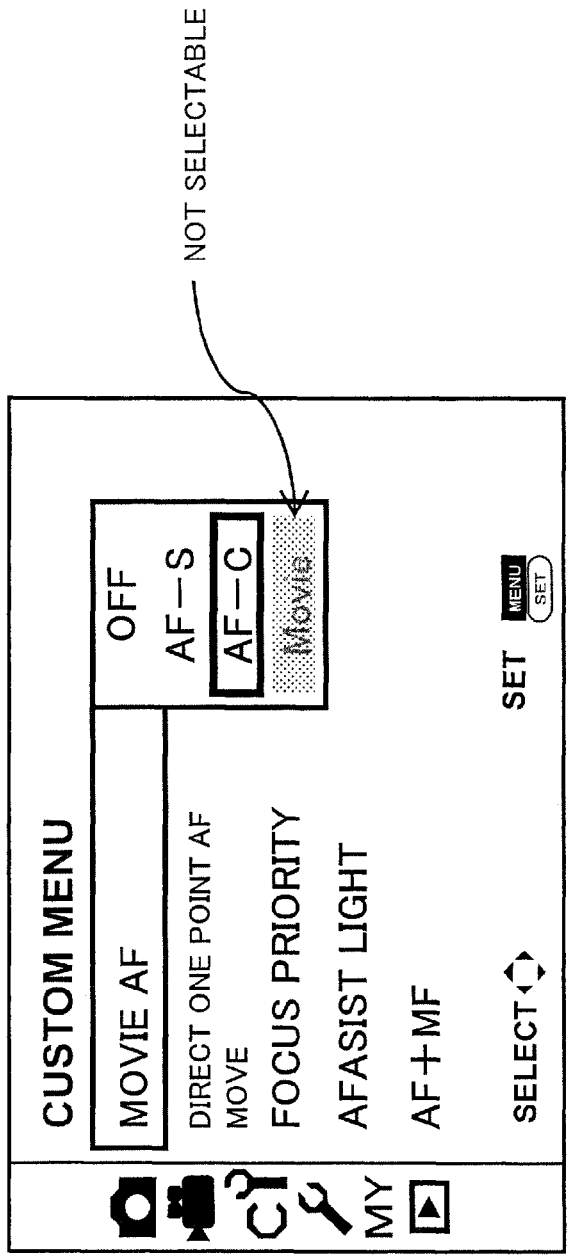
FIG. 10 is a diagram showing an example of driving method setting menus (in a state in which an unselectable driving method is displayed).

Although in the above-described embodiments the configuration is exemplified in which the camera body 100 automatically determines a driving method to be used when performing autofocus control based on driving method information obtained from the interchangeable lens 200, the driving method does not need to be automatically determined. Specifically, a means (e.g., a driving method setting menu or driving method receiving dial) of receiving a selection of a driving method used for autofocus control from the user may be provided and a driving method may be determined based on a manual operation by the user. FIG. 9 shows an example of driving method setting menus displayed on the liquid crystal display monitor 120. As shown in FIG. 9, a plurality of driving method setting menus are displayed on the liquid crystal display monitor 120. By the user moving a cursor 20 on a menu screen displaying the plurality of driving method setting menus, the user can select a driving method used for autofocus control. At that time, the configuration may be such that the camera body 100 does not accept a selection by the user, of a driving method that cannot be supported by the interchangeable lens 200, based on driving method information obtained from the interchangeable lens 200. For example, when the interchangeable lens 200 does not support movie wobbling control, as shown in FIG. 10, a selection of movie wobbling control may not be accepted. By this arrangement, autofocus control that cannot be supported by the interchangeable lens is prevented from being selected by the user and thus the camera body 100 can be prevented from providing an instruction that cannot be carried out by the interchangeable lens 200 to the interchangeable lens 200, thus enabling to suppress occurrence of a malfunction. Note that, in the driving method setting menus in FIG. 9, "AF-S" indicates single AF control, "AF-C" indicates continuous AF control, and "Movie" indicates movie wobbling control. In the present embodiment, when AF-C is selected and the release button 130 is half-pressed by the user, the camera controller 140 causes the lens controller 240 to perform single AF control first to achieve focus and then causes the lens controller 240 to perform continuous AF control to maintain the focus state. In the present embodiment, when AF-S is selected and the release button 130 is half-pressed by the user, the camera controller 140 causes the lens controller 240 to perform single AF control. In the present embodiment, when Movie is selected, the camera controller 140 causes the lens controller 240 to perform movie wobbling control. As such, in the present embodiment, there is a case in which one driving method is assigned to one driving method setting menu and a case in which a combination of a plurality of driving methods is assigned to one driving method setting menu. Note, however, that the configuration does not necessarily need to be like this. The configuration may be such that only one driving method is assigned to one driving method setting menu or only a combination of a plurality of driving methods is assigned to one driving method setting menu.

Alternatively, when a selection of a driving method is received from the user through a driving method setting menu and the like, if the interchangeable lens 200 can support the selected driving method, then the camera body 100 may control the interchangeable lens 200 by the selected driving method, and if the interchangeable lens 200 cannot support the selected driving method, then the camera body 100 may control the interchangeable lens 200 by any other supportable driving method. For example, in the case where the interchangeable lens 200 can support single AF control but cannot support continuous AF control, when single AF control is selected by the user, the camera body 100 may perform control to drive the interchangeable lens 200 by single AF control. Alternatively, when continuous AF control is selected by the user, the camera body 100 may perform control to drive the interchangeable lens 200 by single AF control while providing on the liquid crystal display monitor 120 display indicating that continuous AF control is not supported. By this arrangement, the camera body 100 can always control the interchangeable lens 200 by a supportable driving method.

Although in the above-described embodiments, when the camera system 1 determines, based on obtained driving method information, that the interchangeable lens 200 cannot support movie wobbling control, the camera system 1 provides alert display on the liquid crystal display monitor 120, the process performed when control cannot be supported is not limited thereto. Specifically, the configuration may be such that when it is determined based on obtained driving method information that the interchangeable lens 200 cannot support movie wobbling control, a selection of a moving image recording mode made by the user is not accepted. By this arrangement, unsupportable autofocus control is prevented from being selected by the user and thus the camera body 100 is prevented from providing an instruction that cannot be carried out by the interchangeable lens 200 to the interchangeable lens 200, enabling to suppress occurrence of a malfunction.

Although in the above-described embodiments the configuration is such that movie wobbling control is performed using two AF evaluation values and continuous AF control is performed using three AF evaluation values, autofocus control is not limited thereto. Specifically, movie wobbling control may be performed using three or four AF evaluation values or continuous AF control may be performed using four or five AF evaluation values. In a word, movie wobbling control and continuous AF control may be performed using AF evaluation values of any number.

Although in the above-described embodiments the configuration is such that when an interchangeable lens that supports movie wobbling control is mounted, the camera body 100 performs movie wobbling control on the focus lens 230, the configuration is not necessarily limited thereto. Specifically, when AF evaluation values are low and thus it is determined that the current position of the focus lens 230 is far off a focus point, single AF control may be performed first and then movie wobbling control may be performed. Accordingly, even when the focus lens 230 is far off a focus point, the focus lens 230 can rapidly move to the focus point by single AF control and thereafter the focus state can continue by movie wobbling control.

Although in the above-described embodiments autofocus control for a case where moving image shooting is performed is described, the autofocus control is not necessarily limited thereto. Specifically, autofocus control described in the embodiments may be used to capture a through image.

Although in the above-described embodiments, when moving image shooting is performed at the time when the interchangeable lens 200 that supports movie wobbling control is mounted to the camera body 100, autofocus control is performed by movie wobbling control, the configuration is not necessarily limited thereto. Specifically, the configuration may be such that, when moving image shooting is performed, in principle autofocus control is performed using movie wobbling control, but when a still image shooting instruction, such as half-pressing the release button 130, is accepted from the user autofocus control may be performed by single AF control.

Although in the above-described embodiments a configuration including the zoom lens 210 and the OIS lens 220 is exemplified, they are not essential components. Specifically, the idea of the embodiments can also be applied to a camera system mounted with a single focus lens having no zoom function and a camera system mounted with an interchangeable lens having no camera shake correction function.

Although in the above-described embodiments a camera body with no movable mirror is exemplified, the configuration of the camera body is not limited thereto. For example, a movable mirror may be included in the camera body or a prism for splitting a subject image may be included in the camera body. Alternatively, the configuration may be such that a movable mirror is included in an adapter instead of in the camera body.

Although in the above-described embodiments the CCD image sensor 110 is exemplified as an imaging device, the imaging device is not limited thereto. For example, the imaging device may be configured by a CMOS image sensor or NMOS image sensor.

INDUSTRIAL APPLICABILITY

The idea of the above-described embodiments can be applied to an interchangeable lens that can perform autofocus control by at least one driving method, a camera body to which such an interchangeable lens is mountable, and a lens interchangeable type camera system (specifically, a digital still camera, a digital movie camera, and the like).

Although the above describes specific embodiments, many other variants, modifications, and other uses are obvious to those skilled in the art. Therefore, the embodiments are not limited to the specific disclosure made herein and can only be limited by the appended claims. Note that the present application relates to Japanese Patent Application No. 2008-109870 (filed Apr. 21, 2008), the content of which is incorporated herein by reference.

DESCRIPTION OF THE REFERENCE NUMERALS

1: CAMERA SYSTEM
100: CAMERA BODY
110: CCD IMAGE SENSOR
112: TIMING GENERATOR
130: RELEASE BUTTON
140: CAMERA CONTROLLER
200: INTERCHANGEABLE LENS
230: FOCUS LENS
231: FIRST ENCODER
232: SECOND ENCODER
233: FOCUS MOTOR
240: LENS CONTROLLER

The invention claimed is:

1. A camera body to which an interchangeable lens is mountable, the camera body comprising:
    an imaging unit that can capture a subject image;
    a receiving unit that receives an operation by a user;
    an obtaining unit that obtains driving method information of the interchangeable lens from the interchangeable lens, the driving method information indicating a capability of controlling a focus lens;
    a body controller that controls the camera body and generates a control signal for controlling the interchangeable lens; and
    a sending unit that sends the generated control signal to the interchangeable lens,
wherein
    the body controller determines control to be performed on the interchangeable lens, by referring to the driving method information obtained from the interchangeable lens, and generates a control signal that instructs the interchangeable lens to perform the determined control, and
    the receiving unit receives a selection of one driving method setting menu from a plurality of driving method setting menus, and makes a driving method setting menu, which uses a driving method other than the driving method indicated by the driving method information obtained by the obtaining unit, unselectable.

2. The camera body according to claim 1, wherein
    the body controller generates the control signal according to the operation by the user received by the receiving unit and the driving method information obtained by the obtaining unit.

3. The camera body according to claim 1, wherein when the body controller determines, by referring to the driving method information obtained by the obtaining unit, that a driving method corresponding to the operation received by the receiving unit is not supported by the interchangeable lens, the body controller does not generate a control signal for driving the interchangeable lens in the driving method corresponding to the operation.

4. The camera body according to claim 1, further comprising a display unit that can display information, wherein
    the receiving unit receives a selection about a driving method for the interchangeable lens, and when the driving method for the interchangeable lens received by the receiving unit is not included in the driving methods indicated by the driving method information obtained by the obtaining unit, the body controller controls display on the display unit to display an alert.

5. A camera system comprising an interchangeable lens and a camera body,
    the interchangeable lens comprising:
        a focus lens that changes a focus state of a subject image;
        a drive unit that drives the focus lens back and forth along an optical axis;
        a storage unit that stores driving method information indicating a capability of controlling the focus lens;

a sending unit that sends the driving method information stored in the storage unit to the camera body; and
a lens controller that controls an operation of the interchangeable lens, the camera body comprising:
an imaging unit that can capture a subject image;
a receiving unit that receives an operation by a user;
an obtaining unit that obtains the driving method information of the interchangeable lens from the interchangeable lens;
a body controller that controls the camera body and generates a control signal for controlling the interchangeable lens; and
a sending unit that sends the generated control signal to the interchangeable lens, wherein
the body controller determines control to be performed on the interchangeable lens, by referring to the driving method information obtained from the interchangeable lens, and generates a control signal that instructs the interchangeable lens to perform the determined control, and
the receiving unit receives a selection of one driving method setting menu from a plurality of driving method setting menus, and makes a driving method setting menu, which uses a driving method other than the driving method indicated by the driving method information obtained by the obtaining unit, unselectable.

6. The camera system according to claim 5, wherein
the body controller generates the control signal according to the operation by the user received by the receiving unit and the driving method information obtained by the obtaining unit.

7. The camera system according to claim 5, wherein when the body controller determines, by referring to the driving method information obtained by the obtaining unit, that a driving method corresponding to the operation received by the receiving unit is not supported by the interchangeable lens, the body controller does not generate a control signal for driving the interchangeable lens in the driving method corresponding to the operation.

8. The camera system according to claim 5, wherein
the camera body further comprises a display unit that can display information, and
the receiving unit receives a selection about a driving method for the interchangeable lens, and when the driving method for the interchangeable lens received by the receiving unit is not included in the driving methods indicated by the driving method information obtained by the obtaining unit, the body controller controls display on the display unit to display an alert.

9. A camera body to which an interchangeable lens is mountable, the camera body comprising:
an imaging unit that can capture a subject image;
an obtaining unit that obtains at least one focus driving method from the interchangeable lens mounted to the camera body, the at least one focus driving method indicating a focus driving capability of the interchangeable lens;
a display unit that displays a plurality of focus driving methods including the at least one focus driving method received by the obtaining unit from the interchangeable lens;
wherein the at least one focus driving method received by the obtaining unit from the interchangeable lens is displayed on the display unit as being selectable by a user, and each of remaining focus driving methods among the plurality of focus driving methods which has not been received by the obtaining unit from the interchangeable lens is displayed on the display unit as being unselectable by the user.

10. The camera body according to claim 9, wherein the plurality of focus driving methods include a single auto-focus control, a continuous autofocus control and a manual focus control.

11. A camera system comprising an interchangeable lens and a camera body,
the interchangeable lens comprising:
a focus lens that changes a focus state of a subject image;
a drive unit that drives the focus lens back and forth along an optical axis;
a storage unit that stores at least one focus driving method indicating a focus driving capability of the focus lens;
a sending unit that sends the at least one focus driving method stored in the storage unit to the camera body; and
a lens controller that controls an operation of the interchangeable lens, the camera body comprising:
an imaging unit that can capture a subject image;
an obtaining unit that obtains the at least one focus driving method from the sending unit of the interchangeable lens;
a display unit that displays a plurality of focus driving methods including the at least one focus driving method received by the obtaining unit from the sending unit of the interchangeable lens;
wherein the at least one focus driving method received by the obtaining unit from the sending unit of the interchangeable lens is displayed on the display unit as being selectable by a user, and each of remaining focus driving methods among the plurality of focus driving methods which has not been received by the obtaining unit from the sending unit of the interchangeable lens is displayed on the display unit as being unselectable by the user.

12. The camera system according to claim 11, wherein the plurality of focus driving methods including a single autofocus control, a continuous autofocus control and a manual focus control.

* * * * *